(12) United States Patent
Dabrowski et al.

(10) Patent No.: US 12,280,593 B2
(45) Date of Patent: Apr. 22, 2025

(54) DEVICE AND METHOD FOR PROCESSING DOCUMENTS

(71) Applicant: Mühlbauer GmbH & Co. KG, Roding (DE)

(72) Inventors: Hubert Dabrowski, Chemnitz (DE); Andy Günther, Steinbach (DE)

(73) Assignee: Mühlbauer GmbH & Co. KG, Roding (DE)

( * ) Notice: Subject to any disclaimer, the term of this patent is extended or adjusted under 35 U.S.C. 154(b) by 235 days.

(21) Appl. No.: 18/250,108

(22) PCT Filed: Sep. 29, 2021

(86) PCT No.: PCT/EP2021/076879
§ 371 (c)(1),
(2) Date: Apr. 21, 2023

(87) PCT Pub. No.: WO2022/083994
PCT Pub. Date: Apr. 28, 2022

(65) Prior Publication Data
US 2023/0406012 A1 Dec. 21, 2023

(30) Foreign Application Priority Data
Oct. 23, 2020 (DE) .......................... 102020128018.1

(51) Int. Cl.
*B41J 13/00* (2006.01)
*B41J 11/00* (2006.01)
(Continued)

(52) U.S. Cl.
CPC ....... *B41J 13/0009* (2013.01); *B41J 11/0015* (2013.01); *B41J 11/0055* (2013.01);
(Continued)

(58) Field of Classification Search
CPC ................ B41J 13/0009; B41J 11/0015; B41J 11/0055; B41J 13/12; B41J 29/02;
(Continued)

(56) References Cited

U.S. PATENT DOCUMENTS

2004/0124068 A1* 7/2004 Berndtsson ...... G06K 19/07716
198/608
2004/0263544 A1* 12/2004 Kojima .................... B41J 3/407
347/5
(Continued)

FOREIGN PATENT DOCUMENTS

CN 106446999 A 2/2017
DE 102006031024 A1 1/2008
(Continued)

OTHER PUBLICATIONS

International Searching Authority, "Search Report and Written Opinion," issued in PCT/EP2021/076879 dated Jan. 24, 2022 (14 pages).

*Primary Examiner* — Henok D Legesse
(74) *Attorney, Agent, or Firm* — Wood Herron & Evans LLP

(57) ABSTRACT

A device for processing a document includes a processing device for providing a document to be processed with information when this is in an effective range of the processing device with information; and a traversing device with a document carrier device that can be traversed along a trajectory. The traversing device is configured to receive a document to be processed at a transfer position of the device on or at a document-carrying surface of the document carrier device; to move the received document into the effective range of the processing device for its processing and out of the effective range of the processing device after its processing. The document carrier device is traversed at least in sections, at least with respect to a direction of movement (Continued)

component along a specific (first) direction of movement, which runs orthogonally to a plane defined by three different points on the document-carrying surface.

21 Claims, 8 Drawing Sheets

(51) Int. Cl.
| | |
|---|---|
| B41J 13/12 | (2006.01) |
| B41J 29/02 | (2006.01) |
| G06K 1/12 | (2006.01) |
| B42D 25/405 | (2014.01) |
| B42D 25/41 | (2014.01) |
| G06K 13/077 | (2006.01) |
| G06K 17/00 | (2006.01) |
| G06K 19/077 | (2006.01) |

(52) U.S. Cl.
CPC ............... *B41J 13/12* (2013.01); *B41J 29/02* (2013.01); *G06K 1/12* (2013.01); *B42D 25/405* (2014.10); *B42D 25/41* (2014.10); *G06K 13/077* (2013.01); *G06K 17/0003* (2013.01); *G06K 19/07716* (2013.01)

(58) Field of Classification Search
CPC .... G06K 1/12; G06K 13/077; G06K 17/0003; G06K 19/07716; B42D 25/405; B42D 25/41
See application file for complete search history.

(56) References Cited

U.S. PATENT DOCUMENTS

| | | | |
|---|---|---|---|
| 2007/0231040 | A1* | 10/2007 | Tamaki ................. B41J 3/4071 400/175 |
| 2011/0283902 | A1 | 11/2011 | Lugaresi et al. |

FOREIGN PATENT DOCUMENTS

| | | |
|---|---|---|
| DE | 102006061214 A1 | 1/2008 |
| DE | 202008007564 U1 | 8/2008 |
| DE | 102008051516 A1 | 12/2009 |
| EP | 1435587 A2 | 7/2004 |
| WO | 2011154628 A1 | 12/2011 |

* cited by examiner

DEVICE AND METHOD FOR PROCESSING DOCUMENTS

CROSS-REFERENCE TO RELATED APPLICATION

This application is a national phase entry of, and claims priority to, International Application No. PCT/EP2021/076879, filed Sep. 29, 2021 which claims priority to German Patent Application No. 10 2020 128 018.1, filed Oct. 23, 2020. The above-mentioned patent applications are incorporated herein by reference in their entireties.

TECHNICAL FIELD

This application relates to a device and a method for processing, in particular for personalizing, documents such as card-shaped or book-shaped ID documents.

BACKGROUND

A large number of different types of personalized documents, in particular in the form of cards or books, are known from the prior art. For example, book-like passport documents or individual pages thereof (e.g. the so-called "passport holder page" or paper pages), ID cards and many types of personalized chip cards, such as bank cards, credit cards, ID cards, membership cards, access authorization cards, etc. or personal (usually card-shaped) labels each belong to the group of personalized documents.

"Personalization" or "personalized" means that the corresponding document contains or carries document-specific information that is typically assigned to an owner of the document. In some cases, the information can identify the holder, for example by his name, his passport photo, an identity number or other features that are printed on the document, applied in some other way or incorporated or stored in it, in particular in the form of data. The personalization can in particular be related to a single person, or also to a specific limited group of people, for example employees of a company.

Instead of or in addition to personalizing documents, it can be provided, depending on the application, that a plurality of documents are processed in the same way, for example in order to provide each document with information that is the same for all documents and is therefore not document-specific.

The processing of the documents to provide them with document-specific and/or non-document-specific information can be done in particular by printing, by engraving or, particularly in the case of a plastic surface, by targeted local discoloration of the surface material of the document by the action of energy, in particular by a suitable laser.

A printing device and a method for printing personalization documents are described in German published patent application DE 10 2006 031 024 A1. In this case, the printing device comprises a printing unit for printing on a personalization document located in a printing area and a feed unit for feeding the personalization documents one after the other into the printing area. In this case, the feed unit has a plurality of movable carrier devices in order to receive a personalization document to be printed and to traverse it into and out of the printing area. The device also has a drive device in order to traverse the carrier devices along a feed direction on different planes arranged perpendicularly to the feed direction. It also has a control device for controlling the drive device, so that the multiple carrier devices are each moved alternately between a receiving position, in which a personalization document is received, and the printing area. This is done in such a way that the drive device guides the multiple carrier devices past one another on the various levels when traversing in the feed direction.

Thus, it would be desirable to provide a device and a method with which the process for processing documents can be further improved. In particular, it is desirable to achieve high operational reliability, high document throughput and/or high print quality.

SUMMARY

To achieve these purposes, a first set of embodiments of the invention relates to a device for processing a document. The device has: a processing device for providing a document to be processed with information when this is in an effective range of the processing device; and (ii) a traversing device with a document carrier device that can be traversed along a trajectory. The traversing device is configured: (i) to receive a document to be processed at a transfer position of the device on or at a document-carrying surface of the document carrier device; (ii) to to move the received document by traversing the document carrier device into the effective range of the processing device for its processing and out of the effective range of the processing device after it has been processed, wherein the traversing of the document carrier device for this purpose occurs at least in a section of the trajectory, at least with regard to a movement direction component along a specific (first) direction of movement orthogonal to a plane defined by three different points on the document-carrying surface; and (iii) to rotate the document-carrying surface about an axis of rotation aligned along the specific (first) direction of movement, so that the document can be processed within the effective range of the processing device, depending on the angle of rotation of this rotation, in one of at least two selectable different orientations of the document relative to the processing device.

In the context of the invention, "configured" or "configuration", "set up" or modifications of these terms is to be understood as meaning that the corresponding device is already prepared or adjustable—i.e., configurable—to fulfill a specific function. The configuration can take place, for example, via a corresponding setting of parameters of a process course or of switches or the like for activating or deactivating functionalities or settings. In particular, the device can have multiple predetermined configurations or operating modes, so that the configuration can be carried out by selecting one of these configurations or operating modes.

The axis of rotation can in particular run through a center of gravity or geometric center of the document-carrying surface and/or the document carrier device as a whole. The specific direction of movement is to be understood in terms of a directional vector in space and thus defines a whole class of directional arrows that correspond in direction, amount and orientation.

A "processing device" within the meaning of the invention is to be understood as a subsystem of the device for processing a document, which is set up to provide a document with information. For this purpose, the processing device can have a printing device, for example an inkjet printer or a drop-on-demand printer (DoD printer), a marking laser or a programming head for writing information present as data to a data memory present in the document. Also, the processing device can be multifunctional and for this purpose have several different document processing functionalities, such as inkjet printing and laser treatment. In the case of printing, the information can be applied to the document in particular in monochrome or in color. It is also possible for the processing device to have a combination of at least one printing device for applying ink and at least one additional after-treatment device for the respective ink downstream of the respective printing device, in particular a light source for drying the ink and/or a source for ultraviolet light for curing UV sensitive inks. In addition, the processing device can additionally or alternatively be set up to apply a transparent ink or coating, in particular by a further printing device suitable for this (e.g., "liquid coating"). Optionally, several processing devices can also be provided in the device for processing documents, in particular in such a way that they process the documents serially or in parallel. In some variants, different processing devices can also carry out different method steps, such as printing on the one hand and writing electronic data into a memory of the document on the other hand.

The information with which the document can be provided as part of its processing by the at least one processing device can in particular include document-specific information, in particular "personalization information" and/or non-document-specific information.

According to the invention, the "effective range" of the processing device is to be understood as meaning a spatial area on, in or in the vicinity of the processing device in which the document is provided with the information. In particular, this can be the spatial area in which (i) the printing ink is applied to the document in the case of printing, (ii) the surface-changing effect of the laser on the document surface occurs in the case of laser treatment, or (iii) in the case of programming, a data transfer to a data storage device in the document occurs, for example by electrical contact, induction or short-range electromagnetic radiation.

A "document carrier device" within the meaning of the invention is to be understood as a receiving device for a document to be processed, which is intended to transfer the document into the effective range of the processing device during the processing process and to carry it in the process. For this purpose, the document carrier device can be configured in particular to (i) carry the document like a tray, (ii) accommodate it at least partially in a hollow space (cavity) of the document carrier device, or (iii) fix it by a fixing device on or in the document carrier device, in each case in order to move it along with the document carrier device as it traverses.

A "document-carrying surface" within the meaning of the invention is to be understood in particular as a surface on the surface of the document carrier device that is configured and provided to come into mechanical contact with a document to be processed when it is picked up, in order to support or guide the document as it traverses the trajectory of the document carrier device. The document-carrying surface can in particular be flat, at least in sections.

A "trajectory" within the meaning of the invention is to be understood as meaning a movement curve, in particular of finite length, of an object, here specifically a document carrier device. In particular, the trajectory can have a closed loop shape, in which the object, starting from a node lying on the movement curve, after passing through the movement curve, which then encloses a non-empty surface area, returns to the node, thus connecting the node to itself by a closed loop given by the movement curve. A pure back and forth movement from or to a node, for example along a linear path, such as a rail or other linear guide, thus represents a trajectory in the above mentioned senses, but not a closed loop-shaped trajectory. In particular, the trajectory can define a movement of the object along a closed loop shape in a first trajectory section and a pure to-and-fro movement of the object in another trajectory section. The trajectory can thus in many cases also have trajectory sections which have directional components along at least one second or third direction of movement orthogonal to the specific (first) direction of movement.

With such a device according to the invention, the orientation of the document-carrying surface and thus of the document to be processed can be varied relative to the processing device. In particular, it is conceivable to provide a set of at least two discrete different orientations that can be selected or even one orientation that can be selected steplessly.

Furthermore, the device allows the processing device to be stationary and/or non-rotatable within the device and instead only to move the document to be processed by the movable document carrier device in order to feed it to the processing device or to remove it after processing. In this way, the risk of misalignment or even damage to the often very sensitive processing devices, such as print heads, as is the case with alternative devices in which the processing device or parts thereof have to be moved, can be effectively counteracted.

Due to the rotatability of the document carrier device, it is also possible, in particular, to process one and the same document at different points on the document when the processing device is stationary and/or non-rotatable, even without removing the document from the document carrier device, even if not all of these points can be in the effective range of the processing device at the same time.

Since with some conceivable processing of the document, in particular with a line-by-line or matrix-shaped processing pattern, as is the case with inkjet printing, for example, processing results arise that depend on the relative orientation of the document with respect to the processing device during the processing process, the device can also be particularly advantageous be used to achieve an increase in the forgery security of the document provided with the information. In this sense, the results of processing with different orientations of the document can be used as a security feature.

Preferred embodiments of the device are described hereinafter, which in each case, unless expressly excluded or technically impossible, can be combined as desired with one another and which are equally applicable accordingly to the method described subsequently in accordance with the second set of embodiments of the invention.

According to some embodiments, the traversing device is further configured to traverse the document carrier device in such a way that the document-carrying surface of the document carrier device lies completely within the effective range of the processing device along at least one point of the trajectory. This can advantageously be used to rotate the document by rotating the document-carrying surface accordingly, either before the beginning or after the beginning and before the end of the processing process by the processing device, so that overall the processing of the document can take place with at least two different relative orientations of the document relative to the processing device without the document carrier device having to be moved beyond the rotation in this period of time.

According to some embodiments, the device is configured to process the document with the processing device in its effective range in the sense of a document-specific personalization. For this purpose, the device can in particular store document-specific information associated with the document to be processed, in particular personalization data, or receive it from an information source via an interface and cause the processing device to provide the document with the document-specific information when processing the document. In these embodiments, the device is thus in particular able to carry out personalization or other document-specific processing of the document.

According to some embodiments, the document carrier device has a turntable, which can be rotated about the axis of rotation, with the document-carrying surface and a frame structure which at least partially surrounds the turntable and is non-rotatable with respect to the axis of rotation. Such a construction makes it possible, in particular, to decouple the traversing of the document carrier device from the rotation of the document-carrying surface, in particular in such a way that for the traversing of the document-carrier device along its trajectory, a specific rotational position or rotation of the document-carrying surface that is currently taking place does not have to be taken into account.

According to some of these embodiments, the turntable is driven via a shaft, which is also designed as a mechanical guide for at least one trajectory section of the movement of the document carrier device. This enables a particularly space-saving implementation of the device. In addition, undesired hindrances or limitations of the traverse movement by elements of a drive for the turntable can be effectively reduced or even completely avoided. The trajectory section mentioned can in particular be one that runs exclusively along the specific (first) direction of movement, which in particular makes it possible to arrange the shaft in the same direction as the specific (first) direction of movement and thus the axis of rotation of the turntable, so that no change is required in direction between the shaft and the turntable.

According to some embodiments, the device also has a collision sensor device that is configured to monitor a spatial area between the document carrier device and the processing device and to emit a specific signal if an impending or already occurred collision between the document stored on the document-carrying surface and the processing device is detected. Advantageously, when the signal occurs, a control of the movement of the document carrier device and/or a rotation of the document-carrying surface can be triggered such that the impending collision is avoided or, if a collision has already occurred, this is canceled again or a momentary relative movement between the document carrier device and the processing device is interrupted. In this way, the probability of such collisions occurring can be effectively reduced and, in the event of a collision possibly occurring despite this, the scope of possible damage to the document, the document carrier device or the processing device can be minimized.

According to some embodiments, the processing device comprises at least one document processing element, such as a print head or a laser, for performing processing on the document, which is immobile within the device. This has the advantage that, on the one hand, no measures have to be provided for this document processing element to execute and control its movement and, on the other hand, due to the omission of such a movement, damage or misalignments can be prevented which would otherwise be caused by accelerations occurring during the movement, such as jerky movements when starting, stopping, changing direction or in the form of vibrations.

According to some embodiments, the document carrier device is the only document carrier device of the device that is set up to pick up a document at the transfer position and to traverse it along a trajectory into the effective range of the processing device and then out of the effective range again. This enables maximum flexibility with regard to the possible trajectories of the document carrier device, since there is no need to take into account the trajectories of other document carrier devices, in particular in the sense of collision protection or coordination with regard to a respective stay at the transfer position or in the effective range of the processing device. In particular, this facilitates processing processes in which the document carrier device for processing the document comes to a halt at different locations along the trajectory or the trajectory changes direction, in particular a reversal of direction takes place.

According to some embodiments, the device also has a transport device that is set up to feed a document to be processed along a transport path to the transfer position for receiving it by the document carrier device and to transport away from the transfer position a document that has already been processed by the processing device and output by the document carrier device at the transfer position. In this way, the device manages with a single transfer position, at which the documents are picked up by the document carrier device and the subsequent output of the corresponding document after its processing take place. This not only provides the advantage that a particularly compact design is made possible, but also makes it possible to avoid empty runs of the document carrier device, since a document carrier device that has just been unloaded can be loaded with another document immediately on site without any intervening traverse movement. This also serves to increase the achievable throughput. In addition, especially compared to the teaching of German patent application publication DE 10 2006 031 024 A1, there is no need for separate loading or removal units provided in addition to the document carrier device, since the document carrier device is loaded with the documents directly from the transport device or these are loaded after they have been processed unloaded on this.

According to some embodiments, the design of the device described above can be implemented in such a way that the traversing device has a traversing unit on both sides of the transport path for traversing the document carrier device along its trajectory. In particular, such a solution also allows, in the event of irregular delays occurring in the processing of the document, to react flexibly by appropriate individual control of the individual traversing units in order to be able to ensure continuous operation of the device and thus the desired high throughput.

According to some embodiments, the device is further configured to carry out the traverse movement of the document carrier device along its trajectory in such a way that an intermediate stop takes place at least at the transfer position. This has the advantage that the document carrier device can be loaded and unloaded at the transfer position when the document carrier device is stationary, which simplifies the complexity of implementing the loading and unloading processes and can contribute to increased reliability of these processes and thus the overall operation of the device.

According to some embodiments, the device is further configured, when the document carrier device is at the transfer position, to output a document currently carried by the document carrier device and already previously processed by the processing device and, in its place, to pick up another document that is still to be processed by the processing device through the document carrier device before it resumes its movement for a new run through of its trajectory. In this way, the document carrier device is both unloaded and reloaded on the spot at the transfer position, without the document carrier device having to travel empty in between. A further increase in the throughput of the device can thus be achieved, since in this way the proportion of the trajectory of the document carrier device along which it is not loaded with a document for its processing can be minimized and, in particular, reduced to zero.

According to some embodiments, the trajectory of the document carrier device is defined as a closed loop-shaped trajectory such that during operation of the device, this trajectory has a trajectory section that is traversed twice per trajectory run between the transfer position and a first intermediate position, wherein this trajectory section is traversed on the one hand as part of a movement of the document carrier device away from the transfer position to the first intermediate position and on the other hand offset in time thereto and in the opposite direction as part of a forward movement of the document carrier device from the first intermediate position to the transfer position of the document carrier device. With the help of these embodiments, the movement of the document carrier device along the twice run through trajectory section can be configured with regard to the direction and speed of the movement in such a way, in particular also variably, that undesirable interactions between the document carrier device and the transport device in the area of the transfer position can be minimized or avoided altogether. In particular, an undesired collision of the moving document carrier device with the transport device can be avoided in a simple manner. For this purpose, for example, the movement speed of the document carrier device in the trajectory section can be reduced compared to the movement speed in the other area of the trajectory, in particular compared to the movement speed on the way back from the processing device, and/or a vertical approach of the document carrier device to the transport device can be provided in order to avoid tangential movement components, which could lead to damage.

In some developments of these embodiments, the trajectory of the at least one document carrier device also has a second intermediate position located between the effective range and the first intermediate position, and the device is also configured to optionally rotate the document-carrying surface about the axis of rotation at the second intermediate station or while it is passing through a trajectory section of the trajectory of the document carrier device located between the first intermediate position and the second intermediate position. In this way, a selected orientation of the document received on the document-carrying surface can be effected for its subsequent processing by the processing device before the effective range is reached and thus in particular without a time delay.

According to some embodiments, the device is further configured, in particular optionally, to rotate the document-carrying surface about the axis of rotation while the document-carrying surface is located at least in sections in the effective range of the processing device. This can be used particularly advantageously to process the document at different points on the document that cannot be in the effective range at the same time, or to enable processing at different points on the document from different processing directions, e.g., with differently oriented print patterns. A possible application where this can be used to advantage is the processing of open book-shaped documents. For this purpose, the device can in particular be configured such that in a first orientation of the document it first processes a first opened page of the document and after a rotation of the document-carrying surface and thus the document located on it, processes the other just opened page.

According to some of these embodiments, the document-carrying surface is preferably configured in such a way that the dimensions of the document that can be held on it are limited to a respective maximum dimension with regard to at least one direction of extension running along the document-carrying surface, and at least one such maximum dimension is smaller than or equal to a dimension of the effective range, so that when the document-carrying surface rotates within the effective range of the processing device, the document-carrying surface remains in the effective range of the processing device at least with respect to the at least one direction of extension.

According to some embodiments, the device is further configured, in the event that before or while the document-carrying surface was rotated about the axis of rotation in the effective range of the processing device, the processing is followed by a further rotation of the document-carrying surface to produce the original or another predetermined orientation of the document-carrying surface. The further rotation can in particular be a further rotation in the same direction of rotation as a previous rotation or else in the opposite direction of rotation. In particular, it can be achieved that the document, after being unloaded from the document carrier device, has the same orientation as before when it was picked up by the document carrier device. This further rotation is of particular importance when the orientation of the document for its processing takes place on a document-specific basis. If several documents are then processed one after the other by the device, it can thus be ensured that all documents have the same orientation after they have been loaded, which in particular facilitates further processing of the documents in subsequent process steps.

According to some embodiments, the device is further configured to carry out the traverse movement of the document carrier device in a clocked manner according to a system clock, the trajectory of the document carrier device being divided into at least three trajectory sections and one or two successive path sections being run through for each individual cycle of the system clock. The use of a system clock makes it easier in particular to coordinate and maintain a chronological sequence of the various functionalities of the device used during operation of the device, in particular a chronological coordination of the movement in the respective trajectory sections with the processing of the document by the processing device.

According to some embodiments, the trajectory of the document carrier device is defined in such a way that during operation of the device, this trajectory has a curved section which is passed through several times per trajectory passage and which extends through the effective range, wherein in at least two of these trajectories through the trajectory section during the same trajectory run through, a document picked up by the document carrier device is processed by the processing device while the document carrier device is in the effective range. In this way, several processing operations can take place per trajectory run, which in particular enables more complex processing by different processing methods or for the formation of processing that overlaps one another, for example printing and electronic data transfer or laser processing, per document.

According to some embodiments, the device also has an inspection device upstream of the effective range of the processing device along the trajectory of the document carrier device for detecting the position of a document received by the document carrier device with respect to the document carrier device and for determining and transmitting at least one position parameter characterizing this position. The processing device is configured to carry out a self-calibration on the basis of this at least one position parameter to compensate for any alignment deviations between the document and the processing device determined on the basis of the at least one position parameter, in order to subsequently, on the basis of this self-calibration, process the document independently of its relative position with respect to the to edit the document carrier device carrying it. These measures serve to improve quality with regard to correctly aligned processing of the document, in particular applying or incorporating personalization onto or into the document. In particular, it is therefore possible to dispense with special measures for aligning the document with respect to the processing device or the document carrier device or to design them less precisely, since any alignment correction that may still be necessary can be carried out by the self-calibration mentioned.

Specifically, according to some embodiments based thereon, the processing device can further be configured (i) to process the document by printing; and (ii) as part of the self-calibration, to adapt a target print layout for printing the document by a transformation dependent on the at least one position parameter into a position-compensated print layout that is actually to be printed.

According to further embodiments, the processing device can also be further configured (i) to process the document by laser treatment; and (ii) as part of the self-calibration, to adapt a target laser treatment layout for information to be applied to the document by the laser treatment by a transformation dependent on the at least one position parameter into a position-compensated laser treatment layout to be actually generated.

According to some embodiments, the document carrier device has a fixing device for fixing a document carried by the document carrier device during the run through of its trajectory. In this way it can be achieved that the document retains its position relative to the document carrier device during its joint movement with the document carrier device carrying it, even when changes in direction or other accelerations occur. Consequently, on the one hand, it is firmly connected to the document carrier device, so that it can follow its trajectory. On the other hand, however, the position, in particular the orientation, of the document relative to the document-carrying surface can also be fixed, which in turn advantageously, in conjunction with a temporary locking of the document-carrying surface with regard to its ability to rotate about the axis of rotation, ensures a fixed alignment of the document relative to the processing device during its processing, in particular during individual processing steps, and thus enables quality assurance with regard to the processing of the document.

According to some developments, the document carrier device has a cavity for at least partially accommodating the document, wherein the document-carrying surface is formed at least in sections by a bottom surface of the cavity. In addition, the fixing device has a clamping device that is configured in such a way that during operation, to fix the document in the cavity, it temporarily loads pressure to the document at least from one side in order to press the document against an opposite inner wall, in particular the bottom surface, of the cavity and thereby fix it. In this way, the document can also be carried along and fixed securely in the document carrier device in view of the high accelerations associated with high throughput rates.

For this purpose, according to some variants, the clamping device can be designed in particular to provide the pressure for temporarily loading the document for the purpose of fixing it pneumatically. In some of these variants, the clamping device has a pneumatic pressure chamber for this purpose, which is configured (i) to be filled under pressure at the transfer position and (ii) while the associated document carrier device runs through the trajectory outside of the transfer position, to load the document without external supply of pneumatic pressure for the purpose of its fixation by the clamping device with pneumatic pressure. Such an implementation has the advantage that the fixing of the document in the document carrier device movable along its trajectory can be maintained autonomously without the need for pressurization from outside the document carrier device, for example by pressure supply through pneumatic hoses.

According to some other variants, the clamping device may be coupled to a fixing device provided as part of the document carrier device, which is configured to releasably lock the position of the clamping device when it is pressed onto the document to fix it under pressure. This allows particularly short dwell times at the transfer position and thus particularly high throughput.

According to some embodiments, the document carrier device has an alignment device for aligning a document received by the document carrier device according to a predetermined desired alignment. For this purpose, the alignment device can in particular have one or more, in particular movable, centering pins which are set up to align the document relative to the document carrier device carrying it according to the desired alignment, in particular in the sense of a centering. These embodiments can be used in particular instead of the aforementioned solution by self-calibration or in addition thereto, for example in order to achieve a rough alignment of the document before a finer self-calibration. Such an alignment in turn serves in particular for quality assurance with regard to aligned processing of the document.

According to some embodiments, the device further comprises: (i) a control device for controlling the device, and (ii) a sensor device which is configured to detect one or more current movement parameters of the document carrier device at one or more specific points along the trajectory of the document carrier device and to transmit them to the control device. In this case, the control device is configured to control the device as a function of these respective movement parameters. The movement parameters can relate in particular to a time-dependent position, speed, acceleration or movement direction of the document carrier device or a combination of two or more of the aforementioned movement parameters and can be used in particular to monitor the error-free operation of the device. Furthermore, this sensor device, or optionally another sensor device, can be provided to monitor the loading of the document carrier device with a document and/or the later unloading of the document, in particular with regard to the detection of any malfunctions.

According to some embodiments based on this, the traversing device is set up to vary the trajectory of the document carrier device as a function of a control by the control device based on the movement parameters. In particular, the length of individual sections of the trajectory can be varied. In an exemplary variant of this, such a section can be designed, depending on the control based on the movement parameters, in particular as a straight trajectory or as a curved trajectory of greater length. In this way, in particular if the web speed remains the same, temporary fluctuations in the movement sequence can be corrected during ongoing operation in order to return to error-free operation.

According to some embodiments, the document carrier device has a housing in which there is a cavity for at least partially accommodating the document, wherein the housing has at least one housing recess which is configured in such a way that the document can be processed through it by the processing device, when the document is in the effective range. In this way, a particularly stable fixation of the document in the document carrier device can be achieved at the same time, and processing, in particular printing, of the document can take place through this housing recess without being impaired thereby. Other process steps can also be carried out in the same way in relation to the document through this housing recess, for example laser treatments or magnetization.

According to some of these embodiments, the housing has at least two housing recesses that are adjacent to one another and are separated from one another by an intermediate web. These are configured in such a way that a part of the document exposed by the respective housing recess can be processed through them, in particular one page of a multi-page document bound in a book-like manner, by the processing device when the document is in the effective range. The intermediate web serves in particular as a guide element guiding the document when the document is picked up or output at the transfer position. It can also be used to hold down the document in sections and thus additionally fix it while it is in the cavity of the housing, in particular during the processing of the document in the effective range by the processing device and during transport there and then away again.

According to some of the embodiments, in which the document carrier device has a housing in which there is a cavity for at least partially receiving the document, the device also has a hold-down device which is configured to temporarily, when the document carrier device is at the transfer position, exert a guiding force on the document through the at least one housing recess in order to hold it down at least in places while it is being received into or dispensed from the cavity of the housing. In particular, it is possible to counteract the document getting caught on one or more edges of the at least one housing recess, in order to promote trouble-free picking up and output of the document at the transfer position.

A second set of embodiments of the invention relates to a method for processing documents. The method includes: (i) picking up a document to be processed on a document-carrying surface of a document carrier device of a device for processing documents, in particular a device according to the first set of embodiments of the invention, wherein the picking up takes place at a transfer position of the device; (ii) traversing the document carrier device with the document received by it for its processing into the effective range of a processing device of the device; (iii) processing the document when it is in the effective range of the processing device in order to thereby provide the document with information; and (iv) traversing the document carrier device with the document received by it after its processing out of the effective range. The document carrier device is traversed at least in sections, at least with respect to a direction of movement component along a specific (first) direction of movement, which runs orthogonally to a plane defined by three different points on the document-carrying surface. The document-carrying surface is rotated before or during the processing of the document by the processing device about an axis of rotation aligned along the specific (first) direction of movement, so that the document within the effective range of the processing device depending on the angle of rotation of this rotation can be processed optionally in one of at least two selectable different orientations of the document relative to the processing device. This method thus corresponds to the device described in the context of the first set of embodiments of the invention, so that the advantages, embodiments and developments mentioned there can be used equally for the method according to the second set of embodiments of the invention. Likewise, the various embodiments described above may be combined in any combination and subcombination without departing from the scope of the originally-claimed invention.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Throughout the figures, the same reference numbers are used for the same or corresponding elements of the invention.

In the following detailed description, the terms "x", "y" or "z" or equivalently "X", "Y" or "Z" are used to designate the three spatial directions according to a Cartesian coordinate system and "φ" as a designation used for an angle of rotation of the turntable of the document carrier device about an axis of rotation running along or parallel to the z-axis. The z-axis is perpendicular to a plane defined by three points on the document-carrying surface of the document carrier device. In the exemplary embodiments shown, the document support surface is planar such that it coincides with said plane.

The Z-axis is thus essentially perpendicular to the plane of the document to be processed when this is received on the document-carrying surface. Accordingly, the X-Y plane of the coordinate system is parallel to this plane of the document to be processed.

Figure 1:
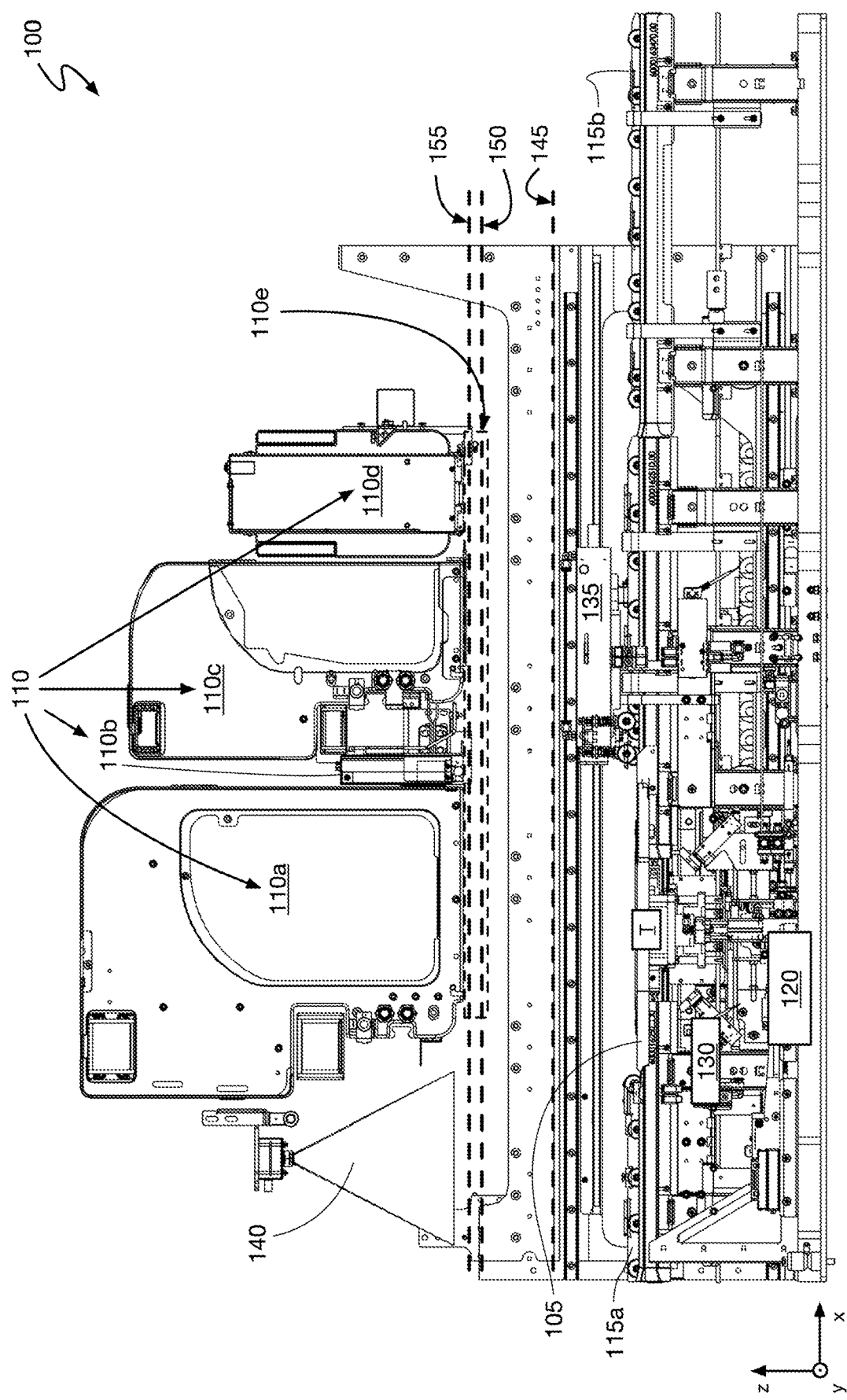
FIG. 1 shows a cross-sectional side view of a device according to an exemplary embodiment of the present invention.

FIG. 1 shows a device 100 for processing a document in lateral cross section, according to an exemplary embodiment. The device 100 has a document carrier device 105 with a turntable rotatable about the Z-axis in a controlled manner, which is shown in more detail in FIGS. 2 and 3. In addition, the device 100 has a document processing system 110, which here, for example, has four different processing devices 110a to 110d, which are set up to process a document that is traversed by the document carrier device 105 along a trajectory into the respective effective range of the processing devices 110a to 110d. For example, the first processing device 110a can be a color printer, the second processing device 110b can be a drying device for drying ink previously printed with a color printer, such as color or monochrome ink, by irradiation with a light source, and the third processing device can be an ink printer for printing UV ink (Ink which is essentially only visible in the ultraviolet spectral range), and the fourth processor 110d, a curing device for curing previously printed ink, such as the UV ink, by irradiation with an ultraviolet light source. Other types of processing, such as applying a transparent ink or coating (e.g. "liquid coating") using a suitable printing device with a subsequent curing step, engraving, in particular laser engraving or transmission of electronic data to the document via corresponding transmission signals, are also possible instead or cumulatively possible. For the sake of clarity, only the cumulative effective range of the entire document processing system 110 is shown in FIG. 1, which, however, includes the individual effective ranges of the various processing devices.

Several or only specific processing devices of the document processing system 110 can be approached or controlled by the document carrier device 105 one after the other or in any order, regardless of the processing direction of the document or process movements or directions of the document carrier device 105 along the trajectory. In this way, maximum flexibility is made possible with regard to the possible processing of the document using the processing devices. In particular this increases the speed of such processing processes in which the document carrier device 105 for processing the document does not control every but only certain selected processing devices along the trajectory.

The device 100 also has a transport device in the form of a conveyor path with a first transport path section 115a for feeding in documents that still have to be processed and a second transport path section 115b for transporting away documents that have already been processed. The loading or unloading of the document into or from the document carrier device 105 takes place at a position of the trajectory lying on the transport path, which is referred to as the transfer position T here. The partially superimposed reference numbers 120 to 140 associated with the drawing in FIG. 1 identify different areas of the device 100 in which some preparatory steps preceding the actual document processing by the document processing system 110 take place, as briefly described below. A pneumatic system is located at reference number 120, which, in conjunction with a centering device 130 for aligning or centering a document newly picked up by the document carrier device, serves in particular to fix or center a document in the document carrier device 105, as will be explained in detail below with reference to FIGS. 4A and 4B.

Traversable ("active") hold-down devices 135 can also be used during certain phases of the processing of a document in order to temporarily fix the document on the document carrier device, as will be explained in detail below with reference to FIGS. 5 and 6.

A visual check is provided in area 140, which can be carried out in particular by a camera and can be used to determine the position of a document recorded by document carrier device 105 relative to the document carrier device 105 in order to adjust a subsequent processing of the document by document processing system 110 accordingly in terms of an adjustment of the processing.

The trajectory of the document carrier device 105 is characterized in particular by the trajectory sections H1 to H7 of the trajectory of the document carrier device 105 shown in FIG. 1. Three different planes 145, 150 and 155 are also shown in FIG. 1, each of which runs orthogonally to the Z-direction. These levels will be discussed below in the context of an explanation of an exemplary method for operating the device 100 with reference to FIG. 1.

Figure 2:
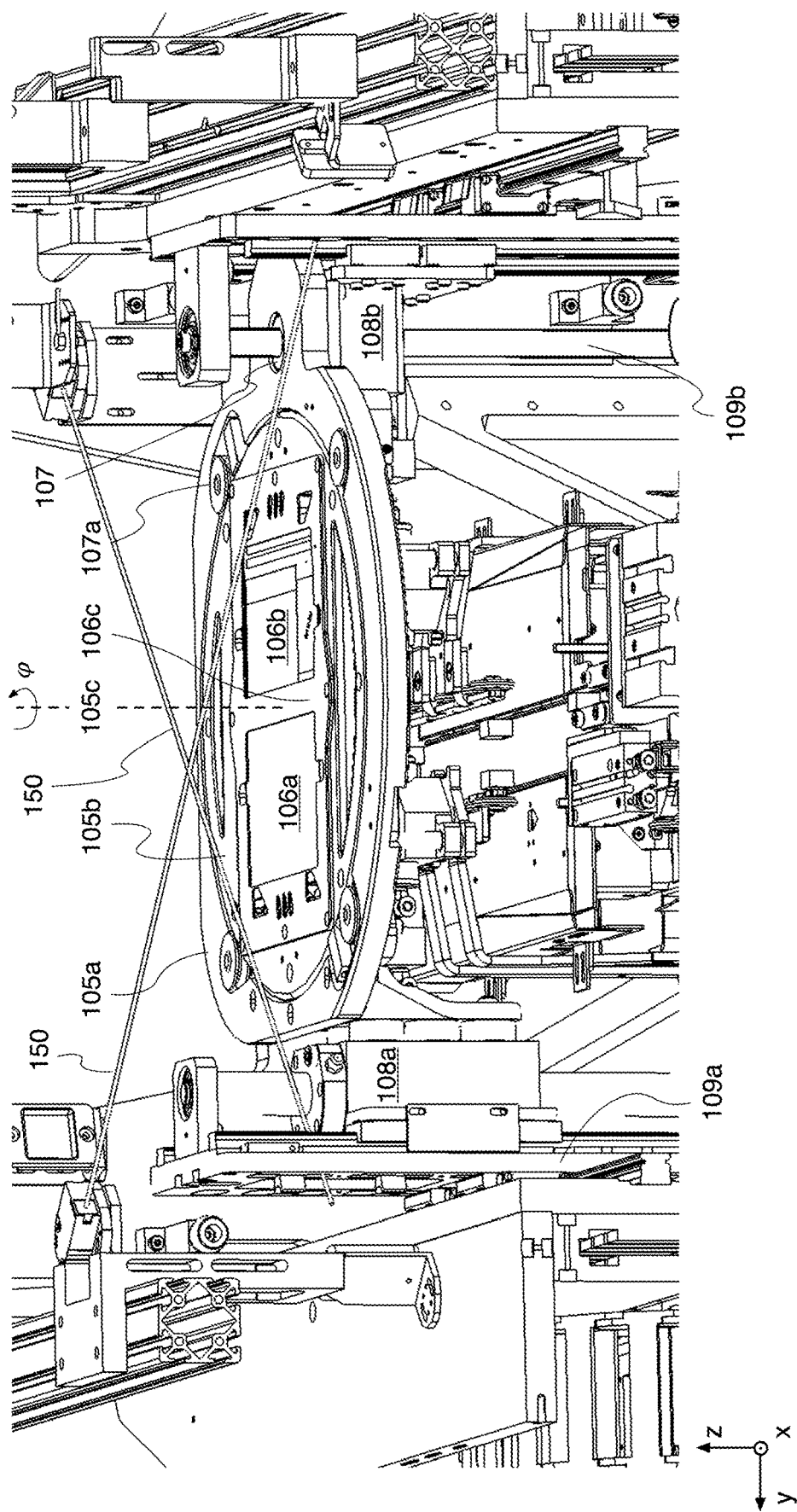
FIG. 2 shows a perspective view of the document carrier device with a turntable and a cavity formed therein with an intermediate web spanning the cavity, wherein the bottom of the cavity forms a document-carrying surface.

In FIG. 2, the document carrier device 105 of the device 100 from FIG. 1 is shown in greater detail. The document carrier device 105 has a turntable 105b which is mounted so as to be rotatable about an axis of rotation 105c and which is surrounded by a non-rotatable frame-like edge structure 105a. The turntable 105b can perform rotations, controlled by a control device (not shown) of the device 100, by a rotation angle φ about a axis of rotation 105c running in the Z direction, preferably bidirectionally, relative to the edge structure 105a. At least two different rotation angle values and thus at least two different discrete resulting orientations of the turntable can be set. Ideally, the rotation angle φ can be selected from an even larger number of different possible rotation angle values or can even be set as desired. The control device can also be set up to also control the traverse movements of the document carrier device 105.

For the purposes of the invention, "control" can be understood not only as controlling, but also as regulating (feedback control) in the sense of open-loop and closed-loop control technology. For this purpose, in particular, movement parameters can be used as input variables, which are supplied by a sensor device of the device 100, which is set up for sensory detection of movement parameters of the movement of the document carrier device along its trajectory.

A cavity for receiving a document to be processed is provided in the turntable. The bottom surface of the cavity, which is flat at least in sections, represents a document-carrying surface of the turntable 105b or of the document carrier device 105. The cavity can in particular have two sections 106a and 106b lying next to one another, in particular continuously merging into one another, which are each intended to receive one half of a book-shaped document, for example a blank passport, in the open state. For example, two adjacent pages of an open passport document can be processed simultaneously or serially, in any case without the position of the document having to be changed within the document carrier device 105.

In order to fix the document accommodated in the cavity, as shown, an upper housing wall of a housing of the document carrier device can be provided which, in addition to housing recesses through which the document stored in the housing of the document carrier device can be processed, may have an intermediate web 106c located between them. Further details of an exemplary housing structure will be explained below with reference to FIGS. 4A and 4B.

For traversing the document carrier device, in particular in the Z direction, the device 100 has two traversing units 108a and 108b, which are driven via a first drive shaft 109a and a mechanical power coupling (not shown in detail) of the two traversing units. For example, the first drive shaft 109a can be a spindle shaft, i.e., a shaft provided with a thread, the rotational movement of which translates into a longitudinal movement of the document carrier device 105, which can thus be moved in the Z direction, i.e., vertically. A second drive shaft 109b, like the first drive shaft 109a, serves on the one hand as a mechanical guide for the traverse movement of the document carrier device 105 along the Z-direction and on the other hand to drive the rotary movement of the turntable. This second drive shaft 109b can in particular be designed as a round rod or rod without a thread. It is preferably force-coupled to the turntable via at least one gear wheel 107 arranged directly on it, in order to drive it in rotation when required. For this purpose, the second drive shaft 109b is coupled to the turntable 105b via at least one drive wheel, in particular gearwheel 107. In addition, one or more bearing rollers 107a can be provided for mounting or additional guidance of the turntable 105b. They are integrated into the edge structure 105a, are drive-less and with the grooves on their front sides they serve as a kind of guide rollers for the turntable. This ensures even better stability when rotating the turntable. FIG. 2 also shows two intersecting monitoring beams that run in the second Z plane and are intended to characterize it here.

Figure 3:
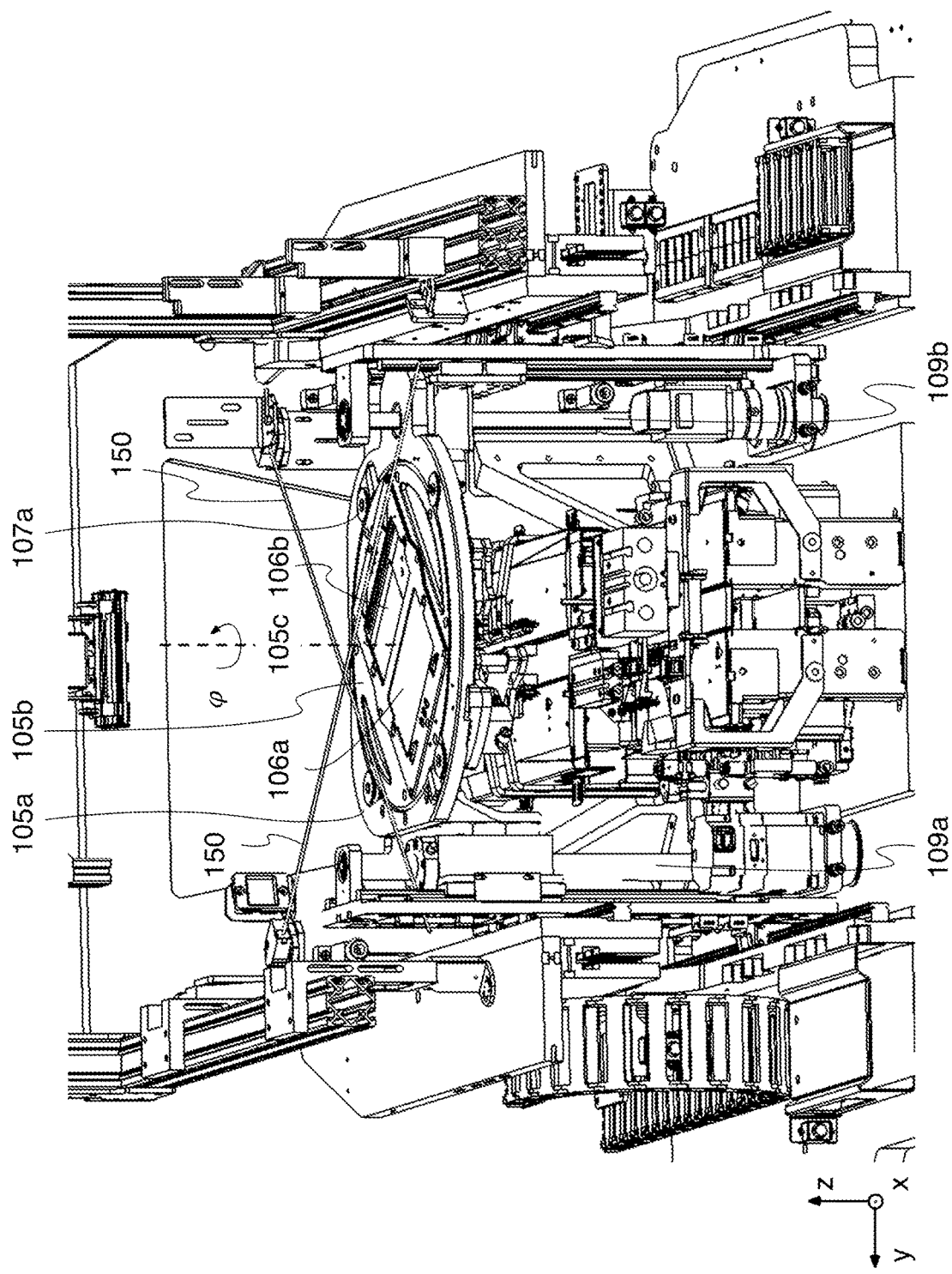
FIG. 3 shows a further perspective view of the document carrier device from FIG. 2 with a turntable rotated by 45°.

FIG. 3 shows the document carrier device 105 from FIG. 2 again, but at a different angle of rotation φ, which here is, for example, 45°. FIG. 3 shows the suspension of the document carrier device by an H-shaped structure, which also includes the traversing units 108a, b and the shafts 109a, b. This H-shaped structure can also be traversed as a whole in the X direction by at least one additional drive, for example by two drives arranged on both sides of the transport path, so that the document carrier device can be traversed overall at least in the X-Z plane and the turntable can also be rotated around the axis of rotation 105c. Embodiments are also possible in which the document carrier device can also be traversed in the Y direction. In particular, this can be solved as for the X-direction via a corresponding ability to traverse of the H-shaped structure as a whole.

Figure 4A:
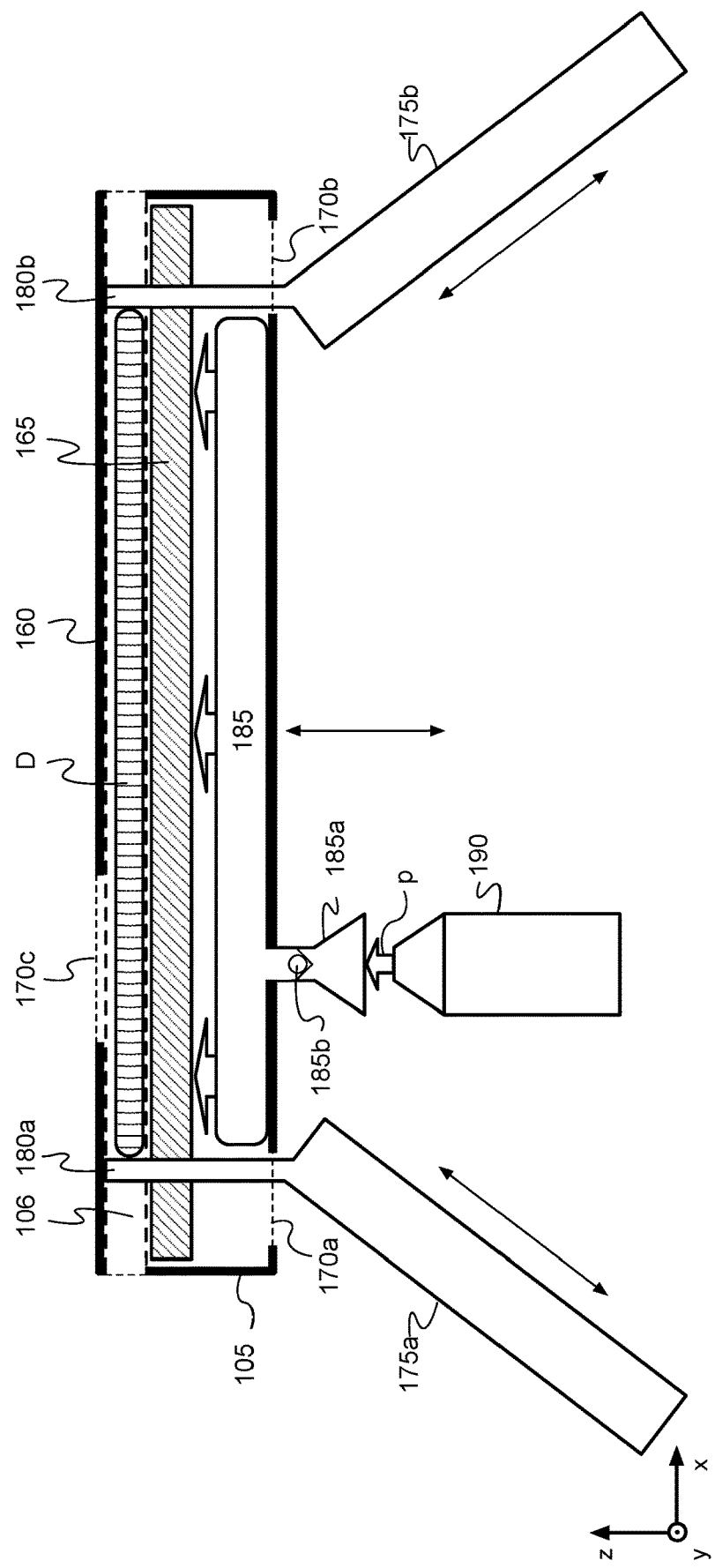
FIG. 4A shows a schematic representation of the document carrier device of the device from FIG. 1 and a fixing device of the device according to a first exemplary embodiment.

FIG. 4A schematically shows a document carrier device 105 of the device 100 and an exemplary fixing device according to a first exemplary embodiment thereof in a cross-sectional view, in which the viewing direction runs perpendicular to the transport direction in the opposite Y direction. In this embodiment, the document carrier device 105 has a housing 160 in which, among other things, the cavity 106 designed as a document shaft 106 (with its two sections 106a and 106b, as shown in FIG. 2) is located, which is designed to accommodate a document D to be processed.

Furthermore, at least one pressure element 165, embodied, for example, as a pressure plate, is provided in the housing 160, which can be loaded with pressure from a pressure chamber 185, which is also located in the housing 160, in order thereby to be moved under pressure in the direction of the document shaft 106. As a result, a document D located in the document shaft 106 can be pressed against the opposite inner wall of the housing 160 (in FIG. 4A this is the upper inner wall) and thus fixed in the document carrier device 105.

For this purpose, the pressure chamber 185 can be filled by a pressurized gas, in particular air in the present example, via a gas or air inlet 185a, in particular at a point in time or a position of the device 100 at or in which the document carrier device 105 is in the transfer position T. Any reference herein to air or pneumatics should be understood as limited to air or compressed air, respectively. In fact, other suitable gases or gas mixtures can equally be used, such as nitrogen.

To fill the pressure chamber with compressed air, a compressed air supply can be provided at the transfer position T of the device 100, which supplies compressed air p through a compressed air nozzle 190 and via the air inlet 185a, which is suitably shaped for the purpose of a temporary airtight connection, into the pressure chamber 185 when the document carrier device 105 has reached the transfer position T and has touched down with its air inlet 185a on the compressed air nozzle 190.

A check valve 185b is also provided in the air inlet 185a and is set up to seal the pressure chamber 185 airtight after it has been filled with compressed air p through the compressed air nozzle 190. In this way, the pressure chamber 185 can also maintain the pressure it exerts, at least indirectly (e.g. via corresponding pneumatic elements), on the pressing element 165 and thus fix the document D when the document carrier device 105 has left the transfer position T to run through its trajectory and thus is cut off from the compressed air supply at the compressed air nozzle 190.

Furthermore, the housing 160 has housing recesses 170a, b for introducing a respective centering element 180a, b for aligning, in particular centering, the document D in the document shaft 106 before it is fixed by the pressing element 165. The centering elements 180a or 180b can be designed in particular as one or more centering pins which can engage through the housing recess 170a or 170b in the housing 160 of the document carrier device 105 when it is in the transfer position T, in order to carry out said centering by mechanical interaction with the document D. For this purpose, the centering elements 180a and 180b, each driven by a linear actuator 175a and 175b, such as a linear motor or a pressure cylinder, can be inserted temporarily into the housing 160. The inclined position of the actuators makes it possible to bring about both the insertion of the centering pins and the centering itself by a single linear movement for each centering element.

Finally, the housing 160 also has at least one housing recess 170c on its upper side for personalizing the document D when it is in the effective range 110e. In particular, the document D can be printed through this housing recess 170c. Other process steps can also be carried out in the same way in relation to the document D through this housing recess 170c, such as drying previously printed ink or contacting the document D with write or read heads for writing or reading data to or from a Data storage of the document D.

Figure 4B:
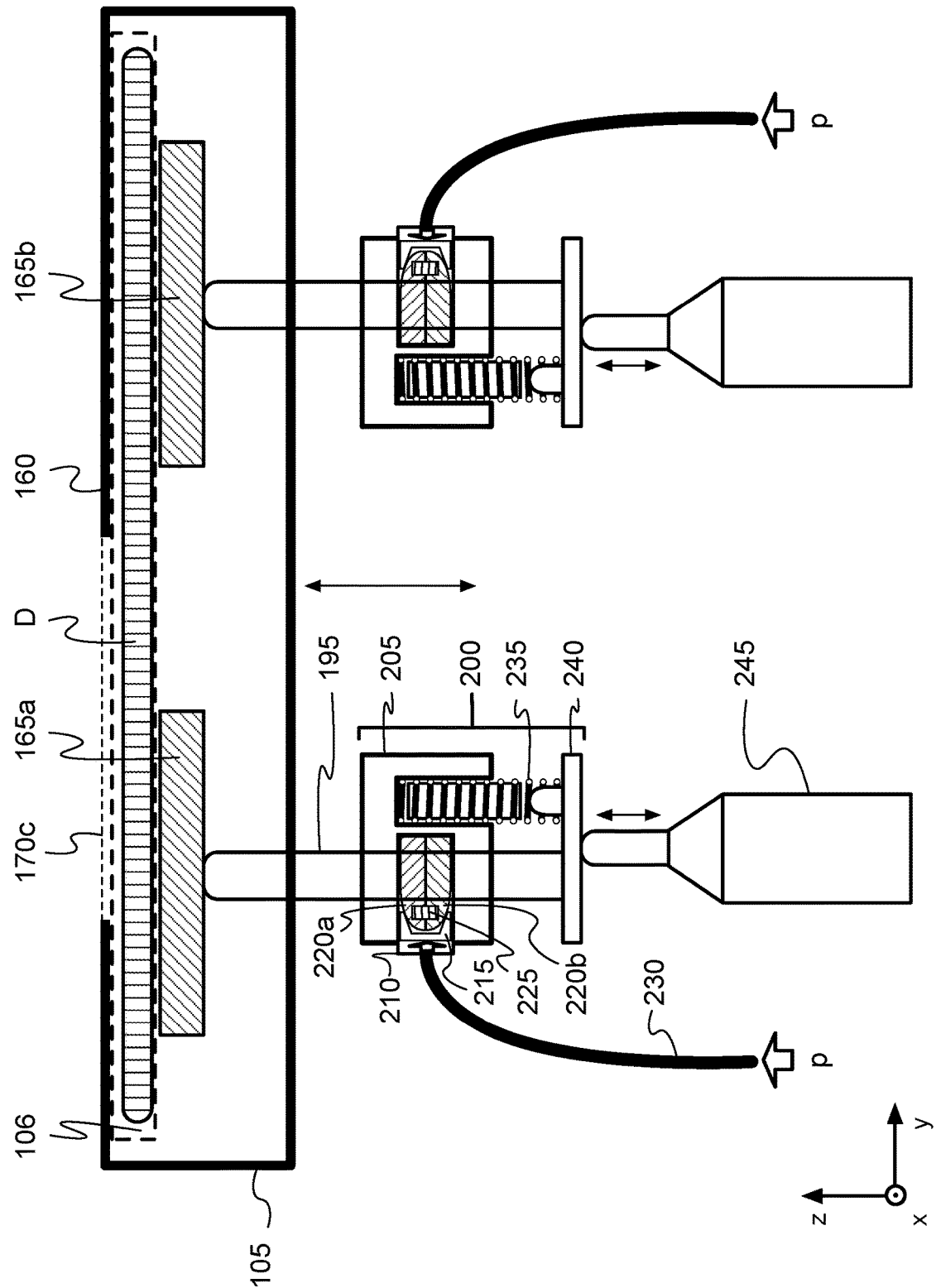
FIG. 4B shows a schematic representation of the document carrier device of the device from FIG. 1 and a fixing device of the device according to a second exemplary embodiment.

FIG. 4B schematically shows a document carrier device 105 of the device 100 and an exemplary fixing device thereof according to a second exemplary embodiment in a cross-sectional view, in which the viewing direction runs again perpendicular to the transport direction, along which the documents D are transported through the transport device 115a, b to or from the transfer position T, in the reverse Y-direction. In this embodiment, a plurality of clamping mechanisms are provided as part of the document carrier device 105, but their operation differs from that of the fixing device of FIG. 4A. Otherwise, the document carrier device essentially corresponds to that from FIG. 4A, including the respective centering functionality.

Instead of a single pressing element, two (alternatively more) pressing elements 165a and 165b are provided in this second embodiment in order to fix the document D in the document carrier device 105 again by pressing it firmly against the opposite inner wall of the housing 160 of the document carrier device 105. Each of the pressing elements 165a and 165b is assigned its own clamping mechanism, the functioning of which will now be explained by way of example using the clamping mechanism for the pressing element 165a.

The pressing element 165a is coupled via a piston rod 195 to a fixing device 200, which is provided to press the pressing element 165a against the document D for the purpose of fixing it and to fix it in this position relative to the document carrier device 105, and for the subsequent release of the document to solve this fixation at the transfer position T temporarily after its processing in order to enable an exchange of the processed document D with a new document that is still to be processed.

The fixing device 200 has a clamping unit 205 with a guide channel for the piston rod 195 in which it can be clamped by a clamping cartridge 210. A shaped piece 215 is arranged in the clamping cartridge 210 so that it can be displaced in a direction perpendicular to the piston rod 195. Furthermore, two clamping jaws 220a and 220b which are mirror images of one another are provided in the clamping cartridge 210. In a first state, in which the clamping jaws 220a and 220b are not forced into a certain position by the shaped piece 215, they are spread apart by a spreading spring 225 located in corresponding opposite recesses of the two clamping jaws 220a and 220b and are thus tilted against each other and against the piston rod 195. In this way, in this first state, the piston rod 195 is clamped by the two clamping jaws and thus locked.

In another, second state, on the other hand, the clamping cartridge 210 is supplied with compressed air p via a compressed air supply 230, which can in particular be designed as a compressed air hose or pipe, which acts on the shaped piece 215 in the clamping cartridge 210 and causes the latter to move under pressure substantially perpendicular to the piston rod 195 in the direction of the jaws 220a and 220b. The two clamping jaws 220a and 220b are shaped on their side facing the shaped piece 215 in such a way that when they come into contact with the shaped piece 215 and are subjected to pressure by this, they are pressed towards one another so that they compress the spreading spring 225 and finally assume a substantially parallel position to one another, as a result of which the canting relative to the piston rod 195 is canceled and this is released. As a result, a compression spring 235, which is also provided in the clamping unit 205 and runs essentially parallel to the piston rod 195, can act and a force directed away from the document carrier device (i.e., downwards in FIG. 4B) can be exerted on a base plate 240 of the clamping unit 205. Since the piston rod 195 is also attached to this base plate 240 with its end opposite the pressing element 165a, this force also acts on the piston rod 195 and the pressing element 165a attached thereto, which is thus pulled away from the document D (downward in FIG. 4B) and thus releases it.

If the newly picked up document D is to be fixed again after the document has been exchanged, the base plate 240 is first moved in the direction of the document D by a piston 245, which can in particular be designed as a pneumatic or motor-driven piston, so that the pressing element 10a finally applies the pressure intended for fixing to the document D. The compressed air in the clamping cartridge 210 is then released, as a result of which the shaped piece 215 is moved back into its original position by a return spring (not shown), the two clamping jaws 220a and 220b are spread apart from one another due to the now again effective expanding spring 225 and canted against the piston rod 195 and this is thus clamped. The first state of the fixing device 200 is thus reached again.

If the trajectory of the document carrier device 105 now begins again, the document D remains fixed in the first state as it passes through the trajectory in this way until, when the transfer position T is reached again, the fixing device 200 is again transferred to the second state in order to enable the subsequent document exchange.

This second embodiment also has the advantage that the document carrier device 105 does not have to be connected to connections for the purpose of fixing the document D, for example to pneumatic hoses or electrical connections, during the passage of the trajectory. Furthermore, this embodiment also allows particularly fast throughput times or high cycle rates since, unlike the embodiment according to FIG. 4A, there is no time-consuming filling of a pressure chamber. The newly received document D is centered or aligned in the transfer position T in the same way as already described above in connection with FIG. 4A.

Figure 5:
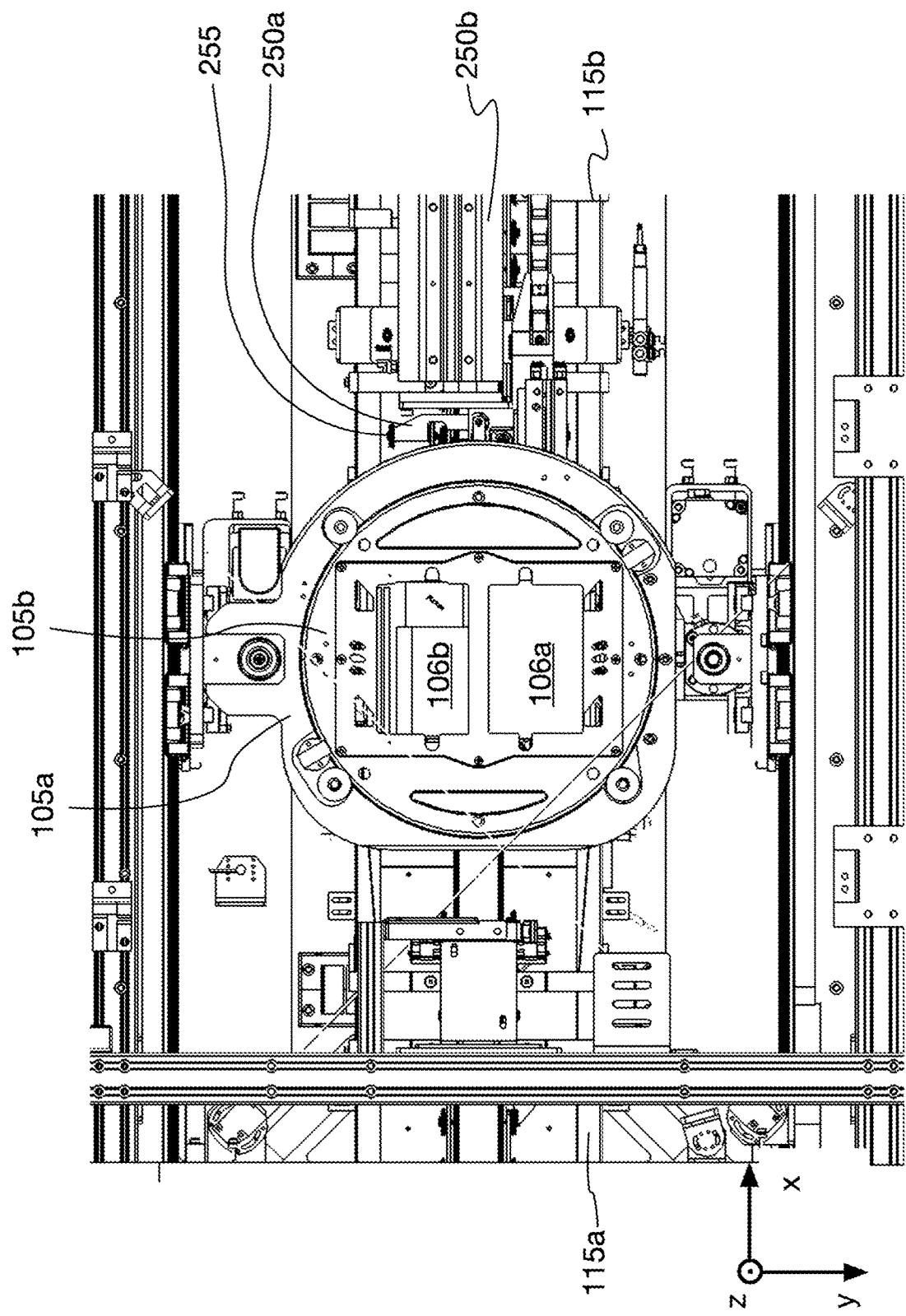
FIG. 5 is a detailed view of the transfer position and its immediate surroundings in a preferred embodiment of a device according to the invention with a hold-down device for assisting the loading and unloading of the document carrier devices, wherein the hold-down device is shown in a deactivated state.
Figure 6:
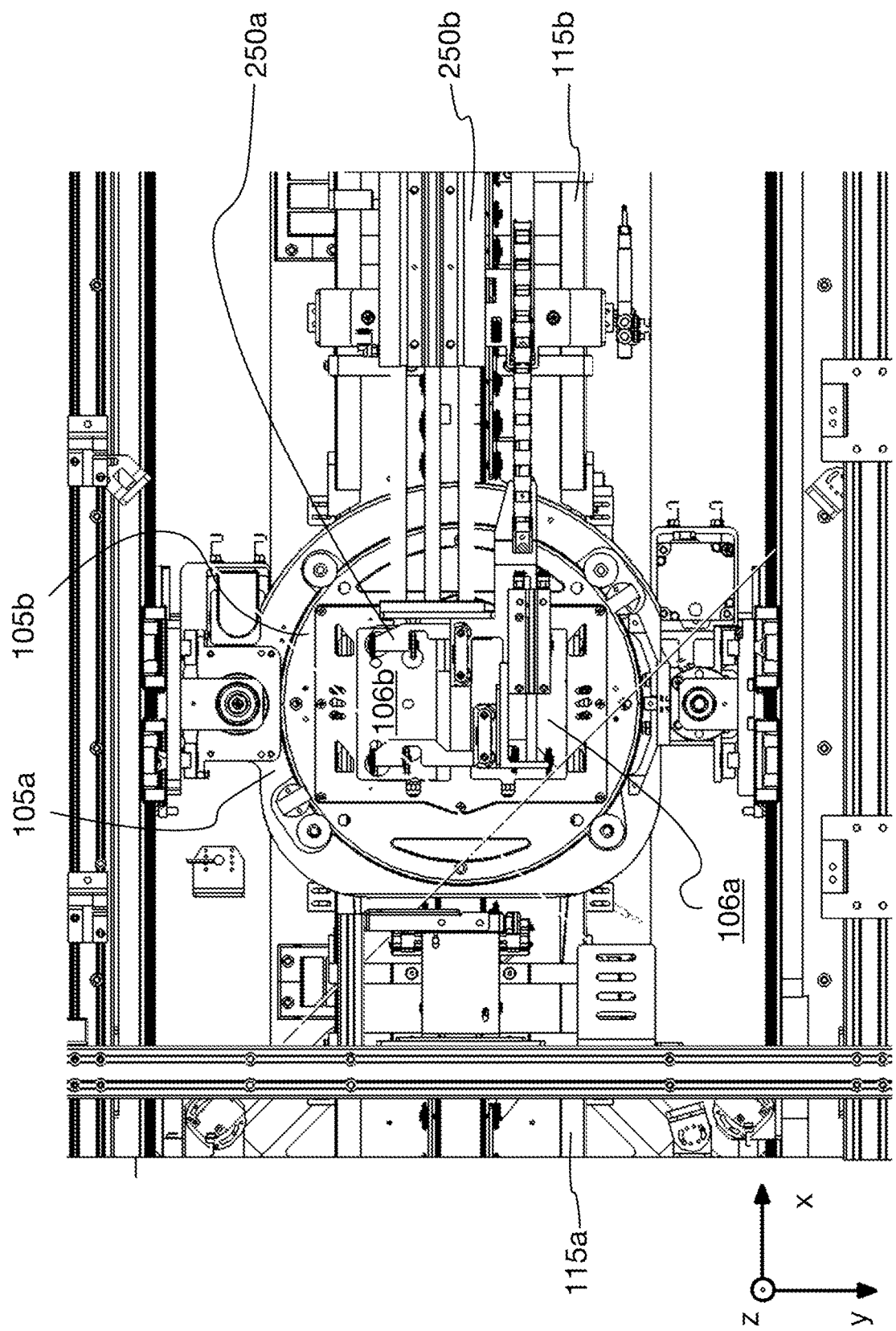
FIG. 6 shows a detailed view of the transfer position and its immediate vicinity in the embodiment of FIG. 5, wherein the hold-down device is shown in an activated state.

FIGS. 5 and 6 each show a detailed view of the transfer position T and its immediate surroundings in a preferred embodiment of the device 100 with the hold-down device 135 to support the loading and unloading of the document carrier device, wherein the hold-down device 135 in FIG. 5 is shown in a deactivated state and in FIG. 6 in an activated state.

The hold-down device 135 has, in particular, a hold-down device 250a and an associated hold-down device drive 250b. The (visible) upper side of the housing 160 of the exemplary document carrier device 105 shown at the transfer position T has two large housing recesses 170c, which are separated from one another by an intermediate web 106c running between them, and which are configured in such a way that a processing of the document D in the document carrier device 105 can take place through them in the effective range 110e. The two housing recesses 170c can be configured, in particular dimensioned and arranged, in particular in such a way that a book-shaped document D, such as a passport, accommodated in the document carrier device 105 is placed in the document carrier device 105 in such a way that two adjacent pages of the open book-shaped document D can be processed simultaneously or immediately one after the other, wherein one of the opened pages is largely exposed by an associated one of the two housing recesses 170c, but at the same time is surrounded in the form of a frame by the top side of the housing 160 in interaction with the intermediate web 106c and thus is fixed. A particularly efficient processing of the fixed book-shaped document D through the respective housing recesses 170c is thus made possible. In particular, an (almost) full-surface passport personalization of the two adjacent open passport pages is possible. For example, it is possible to print the complete personal or holder data with a passport photo on the data page (holder page) or to apply it by laser treatment and/or the other passport page next to it (e.g. paper page or page three in the case of a German passport), likewise to be printed with an additional passport photo and/or additional user data.

The hold-down device 135 is set up such that during operation of the device 100, when the document carrier device 105 is in transfer position T, it temporarily exerts a guiding force on document D through its housing recesses 170c in order to hold it down at least in places while it is being received into or dispensed from the cavity 106 of the housing 160. The hold-down device 135 comprises at least one assembly, which is preferably arranged on one side of the transfer position T, as shown in FIGS. 5 and 6. The assembly has a hold-down device 250*a* provided with guide rollers 255 for physical contact with the document D and a hold-down device drive 250*b* for activating or deactivating the hold-down device 250*a*. The guide rollers 255 can in particular be made of silicone or plastic. During the document transfer when the document D is picked up and output, the guide rollers 255 ensure low friction, so that despite the large housing recesses 170*c*, a sufficiently short process time for the document transfer and protection of the document D during the transfer can be achieved. In a variant (not shown) of the hold-down device 135, it has not just one but at least two hold-down devices or hold-down assemblies, in particular with a respective associated hold-down drive. The hold-down devices or assemblies can then be arranged adjacent to the transfer position T, in particular on different sides, in particular on two opposite sides, such as at least one hold-down device on the first transport path section 115*a* and another hold-down device on the second transport path section 115*b*.

As shown in FIG. 6, in the activated state the hold-down device 250*a* has moved over the housing recesses 170*c* from the state shown in FIG. 5, so that the guide rollers reach through the housing recesses 170*c* and during the processes of picking up and outputting the document D into and out of the document carrier device 105 contacting the document D and holding it down under pressure, which is particularly useful in conjunction with one or more of the above-mentioned pressing elements 165 and 165*a,b*, respectively. In particular, this counteracts the risk that the document could get caught or hit transport guides on an edge of the housing recesses 170*c* or in the area of the second transport path section 115*b* when it is picked up or output.

The device 100 is also configured such that, when the pick-up or delivery process has ended, it switches the hold-down device back into the deactivated state according to FIG. 5, so that the document carrier device 105 can once again begin the next trajectory run undisturbed by the hold-down device. The hold-down device 250*a* is driven by a lifting cylinder. Alternatively, only one hold-down device 250*a* could be provided either via the first transport path section 115*a* for feeding in documents or via the second transport path section 115*b* for transporting away documents. In a further variant (not shown) with hold-down devices arranged on both sides of the transfer position T, these are driven towards and away from each other via lifting cylinders, specifically simultaneously.

The operation of the hold-down device 135 can take place in particular according to the following process scheme:
1. When a document carrier device 105 arrives at the transfer position T after passing through the trajectory, the hold-down device is activated, whereby the hold-down device 250*a* moves from its side over the housing recesses 170*c* of the document carrier device 105.
2. The document that is in the document carrier device 105 and is already personalized is output from the document carrier device 105 and the next document D that has not yet been personalized is received in the document carrier device 105 that has just become free.
3. The not yet personalized document D is centered and clamped in the document carrier device 105 (as previously described).
4. The hold-down device is deactivated so that the hold-down device 250*a* is moved back into its initial position according to FIG. 5 and thereby releases the transfer position T, whereby the newly loaded document carrier device 105 can leave the transfer position T unhindered for a new trajectory run.

The document carrier device 105 can also be configured in such a way that the top of the housing has an exchangeable plate (mask) 260 with the at least one housing recess 170*c*, so that, depending on the type of document and/or the intended personalization, a corresponding adjustment of the device can occur in a simple manner by converting the document carrier device 105 by mask exchange.

Figure 7:
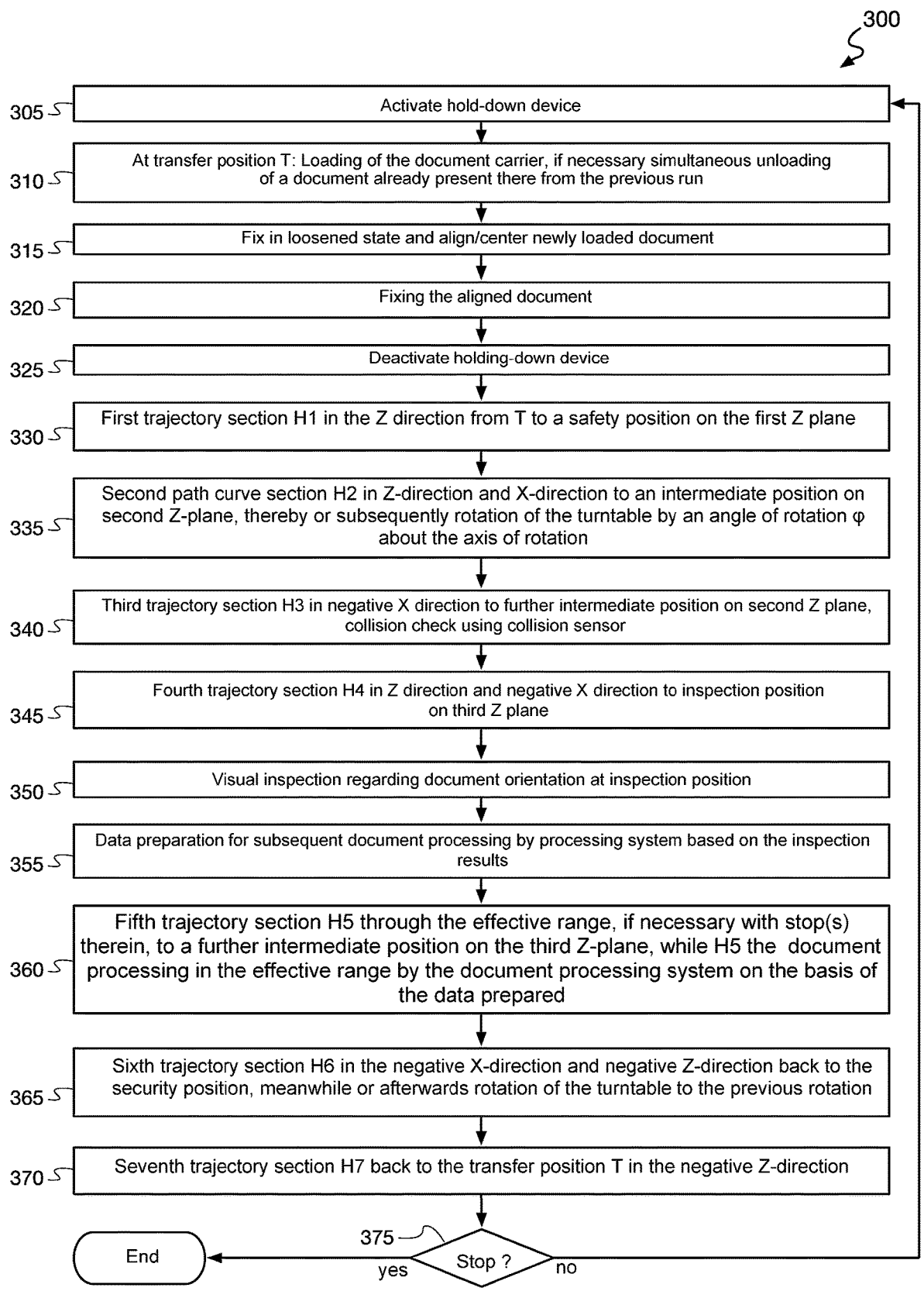
FIG. 7 is a schematic flowchart to illustrate steps of a method for processing a document according to an exemplary embodiment of the invention.

FIG. 7 shows a flow chart to illustrate an embodiment of a method 300 corresponding to the device 100 for processing a document D. In the following description of the method, reference is therefore also made to the device 100, in particular to FIG. 1.

The method 300 begins with a step 305 in which the document carrier device 105 is located at the transfer position T and the hold-down device 135 is activated, wherein the associated hold-down device 250*a* is brought into the activated position shown in FIG. 6. The document carrier device 105 is thus ready to receive a new document D at the transfer position T in a further step 310 for subsequent processing by the document processing system 110. The activated hold-down device 250*a* serves in particular to prevent the document D to be inserted into the document shaft 106 during the subsequent loading process from getting caught on the housing recesses 170*c* of the housing 160 of the document carrier device 105 during the loading process. The same applies analogously to the unloading process after the first run of the method has taken place, if an already processed document is also unloaded from the document carrier device 105 at the transfer position T at the same time as the loading or before it.

When the new document D is loaded into the document shaft 106, it is centered in a step 315 while the fixing device 200 is loosened, depending on the embodiment of the document carrier device 105 as described in detail above with reference to FIG. 4*a* or FIG. 4*b*, respectively thus the document D can still be aligned within the document shaft 106. Subsequently, in a step 320, the fixing device 200 is activated in order to fix the document D in the document shaft for the subsequent passage through the trajectory. In a further step 325, the hold-down device 135, which is now no longer required, is deactivated, wherein the hold-down device 250*a* is brought into the position shown in FIG. 5.

The traversing of the trajectory then begins in step 330, with the document carrier device 105 with the document D fixed therein initially traversing a first trajectory section H1 along the Z direction from the transfer position T to a safety position on the first Z plane 145. For this purpose, the document carrier device 105 is moved correspondingly with the traversing device 108*a, b*.

In step 335, a second trajectory section H2 is run through, with this movement taking place both in the Z direction and in the X direction towards a first intermediate position on the second Z plane 150. During this second trajectory section H2 or at its end, the turntable 105*b* also rotates about the axis of rotation 105*c* by a predetermined angle of rotation (p, which corresponds to a desired orientation of the document for its processing, and which can be 90°, in particular, as in this example.

A third trajectory section H3 follows, which runs in the negative X direction to a further intermediate position on the second Z plane 150. In doing so, the document carrier device 105 passes through a respective detection area of at least one collision sensor, which checks whether there is a risk of document D colliding with document processing system 110, in particular due to document components, such as individual pages of a book-like document, or damage to the document that has occurred as a result of the previous course of the method. In the same way, an impending collision of the document carrier device 105 itself with the document processing system 110 or another part of the device 100 as the trajectory continues to pass through could also be detected, which could be the case, for example, if a misalignment or damage to the document carrier device 105 or the traversing device 108a, b. If such an impending collision is detected, a corresponding warning signal is output, which in particular can cause the device 100 to be switched off for safety reasons.

A fourth trajectory section H4 follows in step 345, which runs along the Z direction and the negative X direction towards an inspection position on the third Z plane 155, which at the same time represents a processing plane since it runs through the effective range 110e, where below the actual document processing will take place. At the inspection position, however, in step 350 is first carried out a visual inspection of the document D loaded in the document shaft 106, in particular with regard to its alignment therein, within the scope of the remaining tolerances for this. On the basis of the inspection results of step 350, which in particular provide the exact position and orientation of the document D in the document shaft 106, the control data for the subsequent control of the document processing system 110 are prepared in step 355. For example, a print pattern or print layout provided for printing the document can be adjusted according to the position and orientation of the document D in order to achieve an optimal adjustment of the print image to be generated on the document D.

In the fifth trajectory section H5 that now follows, in step 360 the document carrier device 105 is moved on the third Z-plane through the effective range 106e to a further intermediate position, wherein the planned document processing in the effective range 106e is carried out by the document processing system 110 on the basis of the data prepared in step 355. Depending on the configuration of the device 100, it is also possible for the trajectory section H5 not to run in a straight line, but instead to have a curve within the Z plane between various of the processing devices 110a to 110d that is curved or has one or more changes in direction, such as direction reversal points.

After the processing has been completed, the document carrier device 105 returns in a sixth trajectory section H6 in step 365 in the negative X-direction and negative Z-direction to the security position. Meanwhile or afterwards, the turntable 105b rotates inversely to the previous rotation in step 335 by the angle of rotation $-\varphi$ or a further rotation of the same without a change in direction u by a further angle $n \cdot 360° - \varphi$, (n=1, 2, 3, ...) so that the turntable 105b is then again in its original orientation as at the starting point T of the trajectory. The direction of rotation (forward/backward) of this further rotation is preferably selected in such a way that when rotating along the selected direction of rotation, the smaller of the two angles of rotation to be traversed to achieve the original orientation is traversed.

Finally, there follows a seventh trajectory section H7, which leads back to the transfer position T in the negative Z-direction. In this respect, the trajectory section H7 can coincide with the first trajectory section H1, although it is traversed in the opposite direction. If there are more documents to be processed (375—no), the method branches back to step 305 for a new run, wherein the document D already processed in the previous run is then unloaded in step 310 of this run and a new document is loaded into the document carrier device. Otherwise (375—yes), the method ends.

While at least one exemplary embodiment has been described above, it is to be noted that a large number of variations thereto exist. It is also to be noted that the exemplary embodiments described only represent non-limiting examples, and are not intended to restrict the scope, the applicability, or the configuration of the devices and methods described herein. Rather, the preceding description will provide those skilled in the art with guidance for implementing at least one exemplary embodiment, wherein it is apparent that various changes in the operation and arrangement of elements described in an exemplary embodiment may be made without departing from the scope of the subject matter defined in the appended claims and its legal equivalents.

What is claimed is:

1. A device (100) for processing a document (D), the device comprising:
   a processing device (110a; 110b; 110c; 110d) for providing a document (D) to be processed with information when this is in an effective range (110e) of the processing device (110a; 110b; 110c; 110d); and
   a traversing device (108a,b) with a document carrier device (105) that can be traversed along a trajectory, wherein the traversing device (108a,b) is configured:
   to receive a document (D) to be processed at a transfer position (T) of the device (100) on or at a document-carrying surface of the document carrier device (105);
   to move the received document (D) by traversing the document carrier device (105) into the effective range (110e) of the processing device (110a; 110b; 110c; 110d) for its processing and out of the effective range (110e) of the processing device after it has been processed, wherein the traversing of the document carrier device (105) to this end takes place at least in a section (H1) of the trajectory, at least with respect to a movement direction component along a specific movement direction (z) which runs orthogonally to a plane defined by three different points on the document-carrying surface; and
   to rotate the document-carrying surface about an axis of rotation (105c) aligned along the specific movement direction (z), so that the document (D), within the effective range (110e) of the processing device (110a; 110b; 110c; 110d) depending on an angle of rotation ($\varphi$) of this rotation, can be processed in one of at least two selectable different orientations of the document (D) relative to the processing device (110a; 110b; 110c; 110d).

2. The device (100) of claim 1, wherein the traversing device is further configured to traverse the document carrier device (105) in such a way that, on at least one point of the trajectory, the document-carrying surface of the document carrier device (105) is completely within the effective range (110e) of the processing device (110a; 110b; 110c; 110d).

3. The device (100) of claim 1, wherein the processing device (110a; 110b; 110c; 110d) is configured to process the document (D) with the processing device (110a; 110b; 110c; 110d) in its effective range (110e) in the sense of a document-specific personalization.

4. The device (100) of claim 1, wherein the document carrier device (105) has a turntable (105b) which can be rotated about the axis of rotation (105c) with the document carrying surface as well as a frame structure (105a) which surrounds the turntable (105*b*) at least in sections and rotationally fixed with respect to the axis of rotation (105*c*),
  wherein the turntable (105*b*) is driven via a shaft (109*b*) which is also designed as a mechanical guide for at least one trajectory section of a movement of the document carrier device (105).

5. The device (100) of claim 1, further comprising a collision sensor device which is configured to monitor a spatial area lying between the document carrier device (105) and the processing device (110*a*; 110*b*; 110*c*; 110*d*) and thereby to output a specific signal, if an impending collision or a collision that has already occurred between the document (D) stored on the document-carrying surface and the processing device (110*a*; 110*b*; 110*c*; 110*d*) is detected.

6. The device (100) of claim 1, wherein the processing device (110*a*; 110*b*; 110*c*; 110*d*) comprises at least one document processing element for performing processing on the document (D) which is immovable within the device.

7. The device (100) of claim 1, wherein the document carrier device (105) is the only document carrier device of the device (100) which is set up to receive a document (D) at the transfer position (T) and to traverse it along a trajectory into the effective range (110*e*) of the processing device (110*a*; 110*b*; 110*c*; 110*d*) and then to move out of the effective range (110*e*) again.

8. The device (100) of claim 1, further comprising a transport device (115*a*, *b*) which is set up to feed along a transport route (115*a*, 115*b*) a document (D) to be processed to the transfer position (T) for receiving the same by the document carrier device (105) and to remove a document (D) already processed by the processing device (110*a*; 110*b*; 110*c*; 110*d*) and output by the document carrier device (105) at the transfer position (T) from the transfer position (T),
  wherein the traversing device (108*a,b*) has a traversing unit on each side of the transport route (115*a*, 115*b*) for traversing the document carrier device (105) along its trajectory.

9. The device (100) of claim 1, wherein the device (100) is further configured to carry out a traverse movement of the document carrier device (105) along its trajectory in such a way that an intermediate stop occurs at least at the transfer position (T).

10. The device (100) of claim 1, wherein the device (100) is further configured:
  when the document carrier device (105) is at the transfer position (T), to output a document (D) currently carried by the document carrier device (105) and already previously processed by the processing device (110*a*; 110*b*; 110*c*; 110*d*) and to receive in its place another document still to be processed by the processing device (110*a*; 110*b*; 110*c*; 110*d*) by the document carrier device (105) before the latter continues its movement for a renewed run through its trajectory.

11. The device (100) of claim 1, wherein the trajectory of the document carrier device (105) is defined as a closed loop-shaped trajectory such that during operation of the device (100), this trajectory has a trajectory section (H1) that is traversed twice per trajectory run between the transfer position (T) and a first intermediate position, wherein this trajectory section (H1) as part of a movement of the document carrier device (105) away from the transfer position (T) to the first intermediate position and offset in time thereto and in an opposite direction as part of a forward movement of the document carrier device (105) is traversed from the first intermediate position to the transfer position (T) of the document carrier device (105),
  wherein the trajectory of the document carrier device (105) further has a second intermediate position located between the effective range (110*e*) and the first intermediate position; and
  wherein the device (100) is further configured to selectively rotate the document-carrying surface about the axis of rotation (105*c*) at the second intermediate position or while passing through a trajectory section (H2) of the trajectory of the document carrier device (105) located between the first intermediate position and the second intermediate position.

12. The device (100) of claim 1, wherein the device (100) is further configured to rotate the document-carrying surface about the axis of rotation (105*c*) while the document-carrying surface is at least partially in the effective range (110*e*) of the processing device (110*a*; 110*b*; 110*c*; 110*d*),
  wherein the document-carrying surface is configured in such a way that dimensions of the document (D) that can be held on it are limited to a respective maximum dimension with regard to at least one direction of extension running along the document-carrying surface, and at least one such maximum dimension is smaller than or equal to a dimension of the effective range, so that when the document-carrying surface rotates within the effective range of the processing device (110*a*; 110*b*; 110*c*; 110*d*), the document-carrying surface remains in the effective range (110*e*) of the processing device (110*a*; 110*b*; 110*c*; 110*d*) at least with respect to the at least one direction of extension.

13. The device (100) of claim 1, wherein the device (100) is further configured, in the event that before or during the document-carrying surface in the effective range (110*e*) of the processing device (110*a*; 110*b*; 110*c*; 110*d*) has been rotated about the axis of rotation (105*c*), to perform, subsequent to the processing, a further rotation of the document-carrying surface to produce an original or another predetermined orientation of the document-carrying surface.

14. The device (100) of claim 1, wherein the device (100) is further configured to carry out a traverse movement of the document carrier device (105) in a clocked manner according to a system clock, wherein the trajectory of the document carrier device (105) is divided into at least three trajectory sections (H1 to H7) and in each case one or two consecutive path sections are run through for each individual cycle of a system cycle.

15. The device (100) of claim 1, wherein the trajectory of the document carrier device (105) is defined such that during operation of the device (100) this trajectory has a curved section (H5) which is passed through several times per trajectory passage and which extends through the effective range (110*e*), wherein in at least two of these passes through the curved section (H5) during a same trajectory pass, a document (D) received by the document carrier device (105) is processed by the processing device (110*a*; 110*b*; 110*c*; 110*d*) while, in doing so, the document carrier device (105) is located in the effective range (110*e*).

16. The device (100) of claim 1, further comprising:
  an inspection device upstream of the effective range (110*e*) of the processing device (110*a*; 110*b*; 110*c*; 110*d*) along the trajectory of the document carrier device (105) for detecting the position of a document (D) received by the document carrier device (105) with respect to the document carrier device (105) and for determining and transmitting at least one position parameter characterizing this position;
  wherein the processing device (110*a*; 110*b*; 110*c*; 110*d*) is configured to carry out a self-calibration on the basis of this at least one position parameter to compensate for any alignment deviations between the document (D) and the processing device (110a; 110b; 110c; 110d) determined on the basis of the at least one position parameter, in order to subsequently, on the basis of this self-calibration, process the document (D) independently of its relative position with respect to the document carrier device (105) carrying it, wherein the processing device (110a; 110b; 110c; 110d) is further configured:
to process the document (D) by printing; and
as part of the self-calibration, to adapt a target print layout for printing the document (D) by a transformation that is dependent on the at least one position parameter into a position-compensated print layout that is actually to be printed; or
to process the document (D) by laser treatment; and
as part of the self-calibration, to adapt a target laser treatment layout for information to be applied to the document (D) by the laser treatment by a transformation dependent on the at least one position parameter into a position-compensated laser treatment layout to be actually generated.

17. The device (100) of claim 1, wherein the document carrier device (105) has a fixing device (200) for fixing a document (D) carried by the document carrier device (105) during a passage of its trajectory;
the document carrier device (105) has a cavity (106) for at least partially receiving the document (D), the document-carrying surface being formed at least in sections by a bottom surface of the cavity (106);
the fixing device (200) has a clamping device (165; 185, 190; 165a, b, 195-245) which is configured in such a way that, in operation for fixing the document (D) in the cavity (106), it temporarily loads pressure to the document (D) at least from one side in order to press the document (D) against an opposite inner wall of the cavity (106) and thereby fix it;
the clamping device (165; 185, 190) is designed to provide the pressure for temporarily loading the document (D) for fixing it pneumatically;
the clamping device (165; 165a,b; 185, 190) comprises a pneumatic pressure chamber (185) which is configured to be filled under pressure at the transfer position (T) and, while the document carrier device (105) runs through the trajectory outside of the transfer position, (T) to load the document (D) without external supply of pneumatic pressure for fixing it by the clamping device with pneumatic pressure; and
wherein the clamping device (165a,b, 195-245) is coupled to a fixing device (200) provided as part of the document carrier device (105) configured to releasably lock the position of the clamping device when this is pressed under pressure to fix the document (D) thereon.

18. The device (100) of claim 1, wherein the document carrier device (105) has an alignment device (175a, b and 180a, b) for aligning a document (D) received by the document carrier device (105) according to a predetermined desired alignment.

19. The device (100) of claim 1, further comprising:
a control device for controlling the device (100), and
a sensor device which is configured to detect one or more current movement parameters of the document carrier device (105) at one or more specific points along the trajectory of the document carrier device (105) and to transmit them to the control device;
wherein the control device is configured to control the device (100) as a function of these respective movement parameters,
wherein the traversing device (108a,b) is set up to vary the trajectory of the document carrier device (105) as a function of a control by the control device based on the movement parameters.

20. The device (100) of claim 1, wherein the document carrier device (105) has a housing (160) in which there is a cavity (106) for at least partially receiving the document (D), wherein the housing (160) has at least one housing recess (170c), which is configured such that a processing of the document (D) by the processing device (110a; 110b; 110c; 110d) is made possible through said recess when the document is in the effective range (106e),
wherein the housing (160) has at least two housing recesses (170c) which are adjacent to one another and are separated from one another by an intermediate web (106c), which are each configured in such a way that through them a processing of a part of the document (D) exposed by the respective housing recess (170c) is made possible by the processing device (110a; 110b; 110c; 110d) when the document is located in the effective range (110e), and
the device further comprising a hold-down device (135, 250a, b, 255) configured to temporarily, when the document carrier device (105) is at the transfer position (T), exert a guiding force on the document through the at least one housing recess (170c) thereof to at least locally hold said document down while it is being received into or dispensed from the cavity (106) of the housing (160).

21. A method (300) for processing documents (D), the method comprising:
receiving (310) a document (D) to be processed on a document-carrying surface of a document carrier device (105) of a device (100) for processing documents (D), wherein the receiving (310) takes place at a transfer position (T) of the device (100);
traversing (360) the document carrier device (105) with the document (D) received by it for the processing thereof in an effective range (110e) of a processing device (110a; 110b; 110c; 110d) of the device (100);
processing (360) the document (D) when it is in the effective range (110e) of the processing device (110a; 110b; 110c; 110d) in order to provide the document (D) with information; and
traversing (H5, H6) the document carrier device (105) with the document (D) received by it after the processing thereof out of the effective range (110e);
wherein the traversing (H1; H7) of the document carrier device (105) occurs at least in sections, at least with respect to a direction of movement component along a specific direction of movement (z), which runs orthogonally to a plane defined by three different points on the document-carrying surface, and
wherein the document-carrying surface is rotated about an axis of rotation (105c) aligned along the specific direction of movement by the processing device (110a; 110b; 110c; 110d) before or during processing of the document (D), so that the document (D), within the effective range (110e) of the processing device (110a; 110b; 110c; 110d), can be processed depending on an angle of rotation (4) of this rotation in one of at least two selectable different orientations of the document (D) relative to the processing device (110*a*; 110*b*; 110*c*; 110*d*).

\* \* \* \* \*